United States Patent [19]
Novak

[11] 3,986,482
[45] Oct. 19, 1976

[54] LIQUID FLOW CONTROL ARRANGEMENTS
[75] Inventor: Karel Novak, Cambridge, England
[73] Assignee: Simplex of Cambridge Limited, Cambridge, England
[22] Filed: June 18, 1975
[21] Appl. No.: 587,812

[30] Foreign Application Priority Data
June 28, 1974 United Kingdom............... 28830/74

[52] U.S. Cl. ........................................... 119/14.08
[51] Int. Cl.² ............................................ A01J 7/00
[58] Field of Search....................... 119/14.08, 14.1

[56] References Cited
UNITED STATES PATENTS

| | | | |
|---|---|---|---|
| 3,556,053 | 1/1971 | Padman et al. | 119/14.08 |
| 3,603,292 | 9/1971 | Finch | 119/14.08 X |
| 3,690,300 | 9/1972 | Tonelli | 119/14.08 |
| 3,786,782 | 1/1974 | Abrahamson et al. | 119/14.08 |

*Primary Examiner*—Hugh R. Chamblee
*Attorney, Agent, or Firm*—Kirschstein, Kirschstein, Ottinger & Frank

[57] ABSTRACT

A control device designed to be responsive to a change in the rate of flow of liquid in a flow line, for example milk in the flow line of an animal milking machine, between a relatively high value and a relatively low value, including a vessel through which the liquid is arranged to pass and in which it can attain different levels, and a control member movable in response to the change in volume of liquid in the vessel between a first position into which it is biased when the vessel is empty, and a second position into which it is arranged to move when the vessel is full, the vessel having in its lower part an aperture through which liquid can flow out of the vessel, and the arrangement, including the size of the aperture, being such that when the liquid flow rate changes from the relatively low to the relatively high value the vessel fills and the control member, which may be the vessel itself or a float, moves to its second position, and when the liquid flow rate changes from the relatively high to the relatively low value to the vessel empties through the aperture and the control member moves to its first position under the action of the biasing force, the device including a mechanism having a trigger release arrangement operable in response to movement of the control member between its two positions to actuate control means.

16 Claims, 5 Drawing Figures

LIQUID FLOW CONTROL ARRANGEMENTS

This invention relates to control devices designed to be responsive to a change in the rate of flow of liquid in a flow line between a relatively high and a relatively low value, and also to animal milking machines incorporating such control devices.

According to a first aspect of the present invention a control device designed to be responsive to a change in the rate of flow of liquid in a flow line between a relatively high value and a relatively low value, includes a vessel through which the liquid is arranged to pass and in which it can attain different levels, a control member movable in response to the change in volume of liquid in the vessel between a first position into which it is biased when the vessel is empty, and a second position into which it is arranged to move when the vessel is full, the vessel having in its lower part an aperture through which liquid can flow out of the vessel, and the arrangement, including the size of the aperture, being such that when the liquid flow rate changes from the relatively low to the relatively high value the vessel fills and the control member moves to its second position, and when the liquid flow rate changes from the relatively high to the relatively low value the vessel empties through the aperture and the control member moves to its first position under the action of the biasing force, the device including a mechanism responsive to movement of the control member between its two positions to actuate control means.

The control member may be a float resting on the surface of the liquid in the vessel, but is preferably the vessel itself arranged to fall under gravity or to rise under the said biasing force according to the quantity of liquid in it.

It will be understood that the terms "upper" and "lower" as used in this specification and the appended claims refer to the operating positions of the device.

Preferably the vessel is contained within an outer container within which it is arranged to move and into which the liquid flowing through said aperture, and otherwise from the vessel at the relatively high flow rate, is arranged to pass and which has an outlet capable of passing the whole of the liquid at the relatively high flow rate.

The vessel may conveniently be open at the top through which the liquid is arranged to enter the vessel and from which it is arranged to overflow into the container at the relatively high flow rate.

In a preferred arrangement said mechanism includes a trigger element adapted to hold an actuating member, coupled to said control means, in a loaded position against the action of a biasing force, the vessel being coupled to a trigger-release member operative upon movement of the vessel from its lower to its upper position to release the actuating member and so cause it to actuate said control means.

The actuating member preferably comprises a pivotted control lever having a weighted end which is arranged to drop from an upper position at which the lever is loaded to a lower position upon release of said trigger element, and the vessel may be biased into its upper position by a second pivotted lever having a weighted end which provides the vessel biasing force, the arrangement being such that an upper position of the said second lever corresponds to the lower position of the vessel and a lower position of said second lever corresponds to the upper position of the vessel, and such that movement of said second lever from its upper to its lower position causes said trigger release member to operate the trigger element and release the control lever.

The trigger release member may be pivotted on an extension of said second lever beyond its pivot and away from its weighted end, and formed with a shoulder such that on movement of the second lever from its lower to its upper position the shoulder engages with the trigger element so that upon subsequent movement of the second lever from its upper to its lower position the trigger element is operated by the upward pull of the shoulder.

Preferably the control lever carries a pawl by means of which it is held in its loaded upper position by the engagement of the pawl in a detent carried by the trigger element, the latter being of resilient cantilever form so as to return to its initial position after being raised by the trigger release member shoulder to allow the control lever to fall.

The movement of the actuating member may be arranged to open or close a valve between the inlet and outlet of a gas flow passage carried by the device.

It will be understood that the invention includes within its scope control devices having a trigger release control mechanism as aforesaid arranged to be operated by other forms of liquid level responsive means, for example a float in said vessel which rises or falls with the level of the liquid, the vessel then remaining fixed in position.

According to a second aspect of the present invention a milking machine of the kind comprising a teat-cup cluster arranged to be applied to the teats of an animal's udder during the milking operation, and vacuum means connectable to the teat-cup cluster through a flow line for drawing milk from the udder in use of the machine, incorporates a control device according to the first aspect of the invention arranged to control actuating means for withdrawing the teat-cup cluster from the animal's udder when the rate of flow of milk in the flow line falls below a predetermined low value corresponding to completion of the milking operation.

Preferably said control means of the control device is operative, when actuated, to cut off the vacuum to the test-cup cluster and to apply a vacuum to a piston and cylinder arrangement the piston of which is connected to the teat-cup cluster and arranged to withdraw the teat-cup cluster from the animal's udder when the vacuum is applied to the cylinder.

The control means preferably includes a valve carried by the control device and connected in a gas flow passage between said vacuum means and the piston and cylinder arrangement, the control device being operable to actuate the valve to apply vacuum to the cylinder when the rate of flow of milk in the flow line falls below said predetermined low value.

The said valve may also be arranged, upon actuation, to disconnect the vacuum means from the test-cup cluster so as to release it from the animal's udder.

Alternatively the teat-cup cluster itself may carry a vacuum shut-off valve having a closure member normally biased into its open position, the piston of the piston and cylinder arrangement being coupled to the teat-cup cluster via said closure member by a flexible cable, the arrangement being such that upon application of a vacuum to the piston and cylinder arrangement, the piston pulls on the cable to draw the closure member into its closed position and thereby cut off the vacuum to the teat-cup cluster, and subsequently withdraws the teat-cup cluster from the animal's udder.

The invention will be further described, by way of example, with reference to the accompanying drawings, of which:

Figure 1:
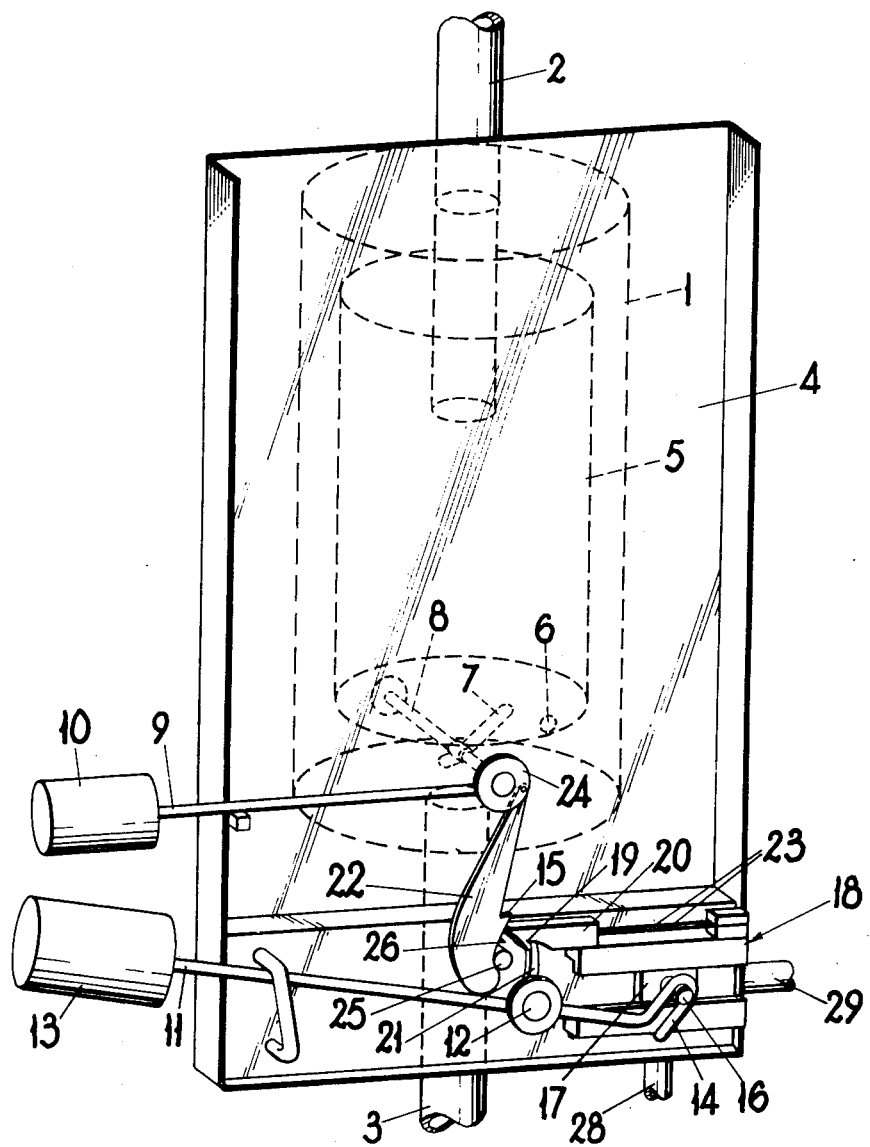
FIG. 1 shows a control device in accordance with the first aspect of the invention.

Referring to FIG. 1, the control arrangement comprises an outer container 1 having an inlet tube 2 and an outlet tube 3 suitable for connection to upstream and downstream sections of a fluid flow line. The outer container 1 is supported on one side of a support plate 4 by any suitable bracket means (not shown). Located within the outer container 1 is an open topped vessel 5 into which the inlet tube 2 projects downwardly, the vessel 5 having a small aperture 6 in its base through which liquid flowing into the vessel can drain at a rate determined by the size of the aperture. It will be appreciated that such a single aperture might in some cases be replaced by two or more small apertures serving the same purpose in aggregate effect, and all such aggregates of apertures are to be regarded as "an aperture" for the purpose of this invention.

The vessel 5 is movable within the container 1 between upper and lower limit positions and rests on an arm 7 rigidly connected to a shaft 8 journalled in the outer container 1 so as to be rotatable. One end of the shaft 8 extends through the support plate 4 and is rigidly connected to one end of a lever 9 arranged to pivot about the axis of the shaft, and carrying at its other end a weight 10.

The weighted lever 9 is capable of maintaining the vessel 5 in its upper position when the latter is empty, but when the level of liquid in the vessel 5 rises above a predetermined point, the weight of liquid will cause the vessel to drop to its lower position thus raising lever 9. The vessel is shown in FIG. 1 in its upper position.

The control device further includes a control lever 11 pivotally supported intermediate its two ends at 12, and carrying a weight 13 at one end and formed at its other end with an elongate hook 14 slidably engaging between its two limbs a lug 16 projecting from a closure member 17 of a valve 18 supported on the device. Upon movement of the control lever 11 from an upper position in which it is shown, to a lower position, the valve member 17 is caused to slide from a closed to open position, and vice versa.

The control lever 11 is releasably held in its upper position by the engagement of a pawl 21 fixed at 12 to the control lever 11 in a detent 19 formed in a spring-loaded trigger element 20 supported by spring wires 23.

A trigger release member 22 is pivotally supported eccentrically with respect to the shaft 8 by a disc 24 from which it hangs freely such that upon upward movement of the weighted lever 9, the trigger release element drops and vice-versa.

The trigger release element is formed on one edge with a shoulder 15 arranged to engage the trigger element 20 upon downward movement and to raise and release the trigger element 20, causing the control lever 11 to drop to its lower position, upon upward movement, the release member 22 being further formed on its said one edge with a profiled cam surface 26 arranged to ride on a lug 25 such that upon further upward movement, the release member 22 is disengaged from the trigger element 20.

In operation of the device to open the valve 18 in response to a drop in the rate of flow of liquid in a flow line below a predetermined value, the control lever 11 is raised to and held in its loaded position in which the valve 18 is closed.

As liquid flows into the vessel 5 through the inlet 2 at a rate greater than the predetermined value, the vessel will fill up, only a portion of the flow passing through the aperture 6, causing the vessel to fall under gravity and raise the lever 9 to its upper position, thus lowering the trigger-release member 22. The vessel 5 will remain filled while the rate of flow exceeds the predetermined value, excess flow of liquid overflowing down the sides of the vessel 5 and through to the outlet 3.

When the rate of liquid flow falls below the predetermined value, determined by the size of the aperture 6, the whole of the flow will pass through the aperture 6 and the vessel 5 will start to empty. When the level of liquid in the vessel 5 falls below a predetermined point the vessel 5 will rise to its upper position under the action of the weighted lever 9.

As the lever 9 drops to its lower position it lifts the trigger release member 22, and the shoulder 15 will lift the trigger element 20 to release the pawl 21 and permit the control lever 11 to drop thereby opening the valve 18.

The valve 18 may be of any suitable form, although as shown it comprises a valve member 17 slidable between two positions, over a plane surface in which are formed two ports communicating respectively with the inlet and outlet tubes 28, 29 of a gas-flow line. In the first position, i.e. the closed position, the valve member covers and shuts-off the port communicating with the tube 29; and in the second position, i.e. the open position, it provides a communicating passage between the two ports via a recess formed in the surface of the valve member 17 facing the two ports.

Figure 2:
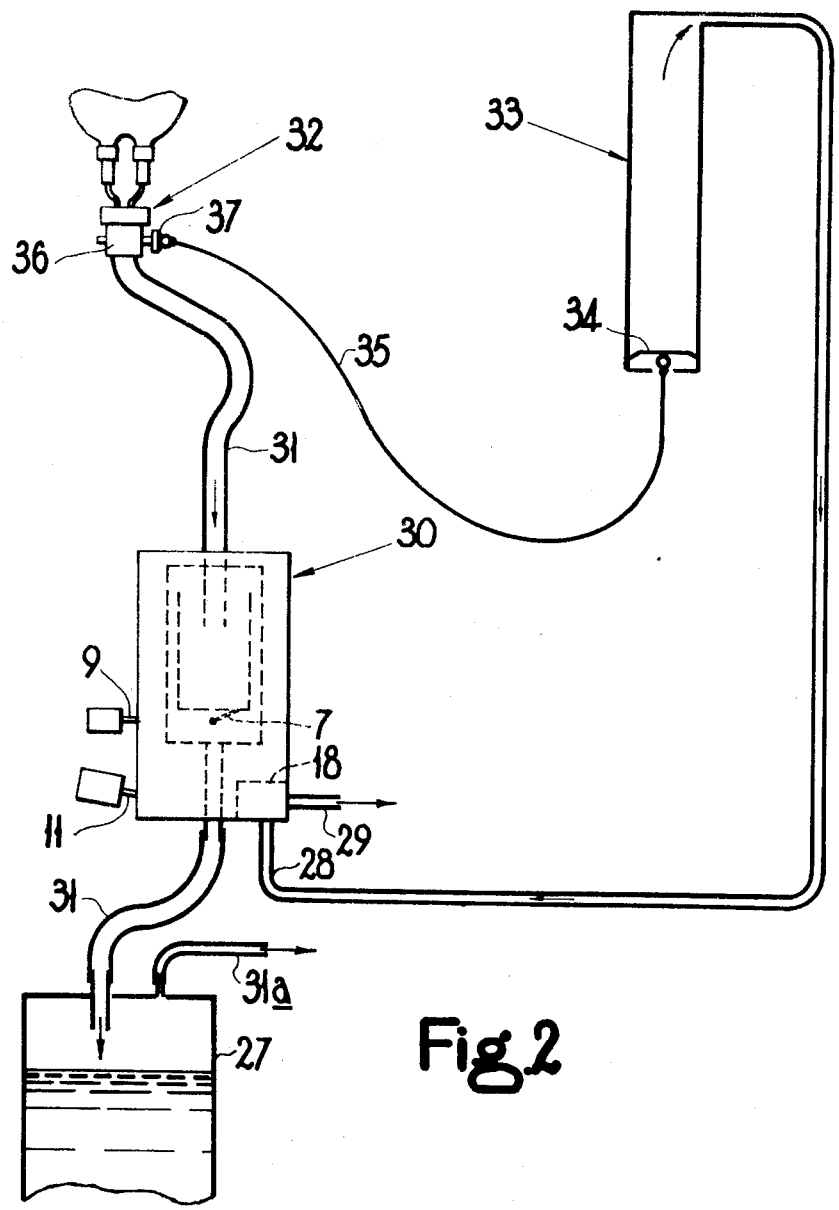
FIG. 2 is a diagrammatical representation of a milking machine in accordance with the second aspect of the invention.

In the application of the device to a cow milking machine in accordance with the second aspect of the present invention as shown in FIG. 2, the tube 29 is connected to a vacuum supply, while the tube 28 is connected to a vacuum-operated teat-cup withdrawal means as will now be described.

FIG. 2 shows schematically, a milking machine incorporating a control device 30 as described with reference to FIG. 1, in which the inlet and outlet tubes 2, 3 are connected to the upstream and downstream sections of a milk flow line 31 which connects a teat-cup cluster 32 to a vacuum milk collecting jar 27, connected via tube 31a to a vacuum supply (not shown) arranged to apply a vacuum through the flow line 31 to withdraw wilk from the cow's udder.

The tubes 28, 29 are connected to a piston and cylinder device 33, and the vacuum supply respectively, the piston 34 of the piston and cylinder device being connected to the teat-cup cluster 32 via a flexible cable or cord 35. The teat-cup cluster carries a vacuum shut-off valve 36 biased into an open position, and the cord 35 is connected to the closure member 37 of the valve 36.

At the start of a milking operation, the control lever 11 of the control device is raised to its upper position thereby closing the valve 18, and the operating sequence of the control device as the flow of milk starts, rises above, and then falls below the predetermined value thereby actuating the valve 18, is as already described in connection with FIG. 1. The size of the aperture 6, and the dimensions of the vessel 5 are arranged such that upon substantial cessation of milk flow, indicating that the cow has stopped milking, the vessel 5 will empty in approximately 25 to 30 seconds.

When the valve 18 is opened by the control device 30, the vacuum supply is connected by the valve 18 to the piston and cylinder device 33 which applies a pull to the cord 35 thereby closing the valve 36 to shut off the vacuum supply to the teat-cup cluster 32. The cluster will then fall under its own weight from the cow's udder and be withdrawn by the flexible cord 35 as it is pulled up by the piston 34 of the piston and cylinder device 33.

The teat-cup cluster 32 will then be supported by the piston and cylinder device 33 until the control lever 11 is reloaded ready for the next milking operation whereupon the valve 18 is automatically closed to shut-off the vacuum supply to the piston and cylinder device 33.

Alternatively, the lever 11 can be reloaded automatically as the teat-cup cluster 32 is withdrawn, for example by a looped cord (not shown) connected between the lever 11 and the piston 34 of the piston and cylinder device 33. In this case the teat cup cluster 32 is supported by separate means to prevent it dropping to the ground when air is admitted to the piston and cylinder device 33.

Figure 3:
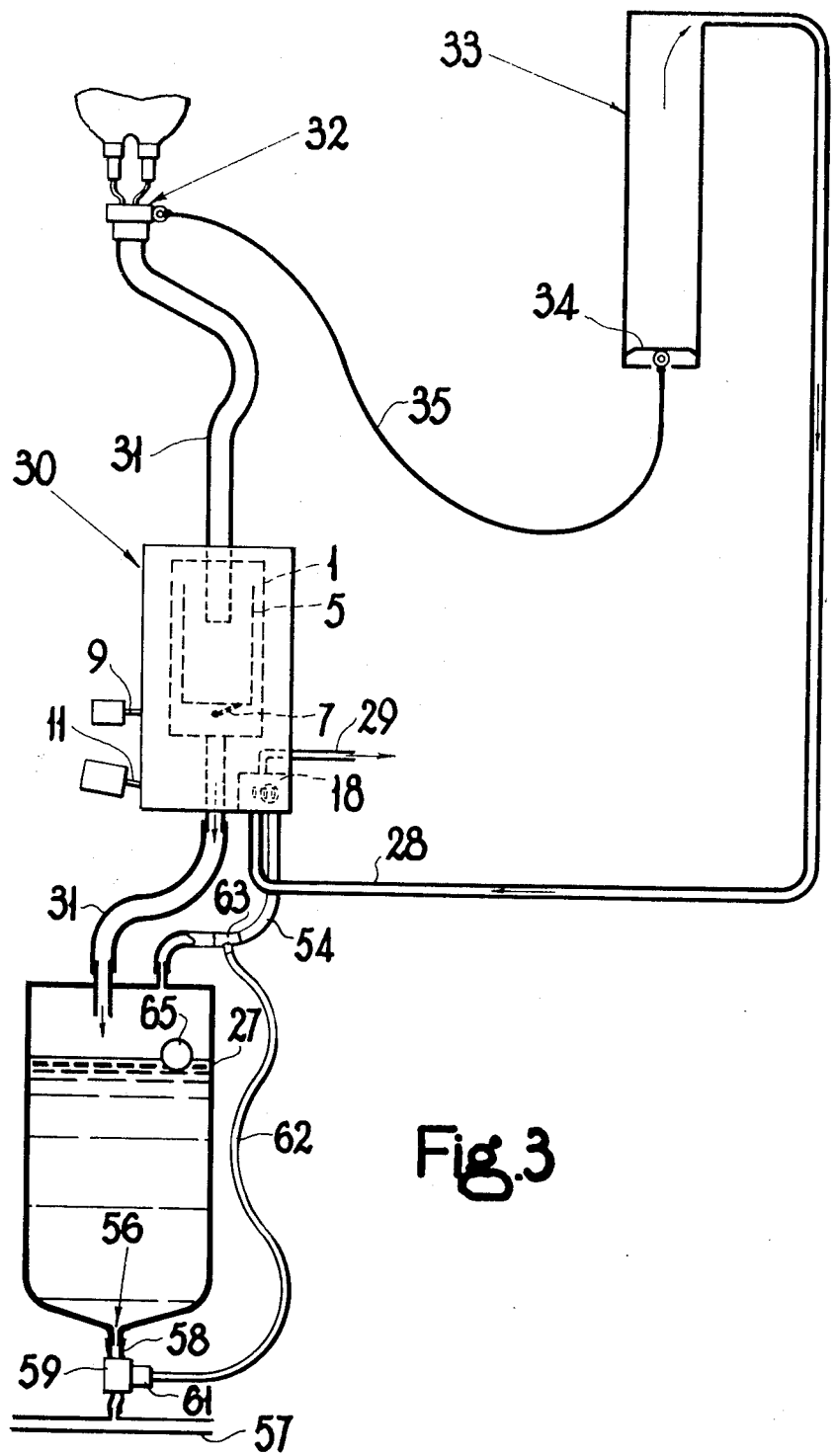
FIG. 3 is a diagrammatic representation of a modified form of the milking machine of FIG. 2.
Figure 4:
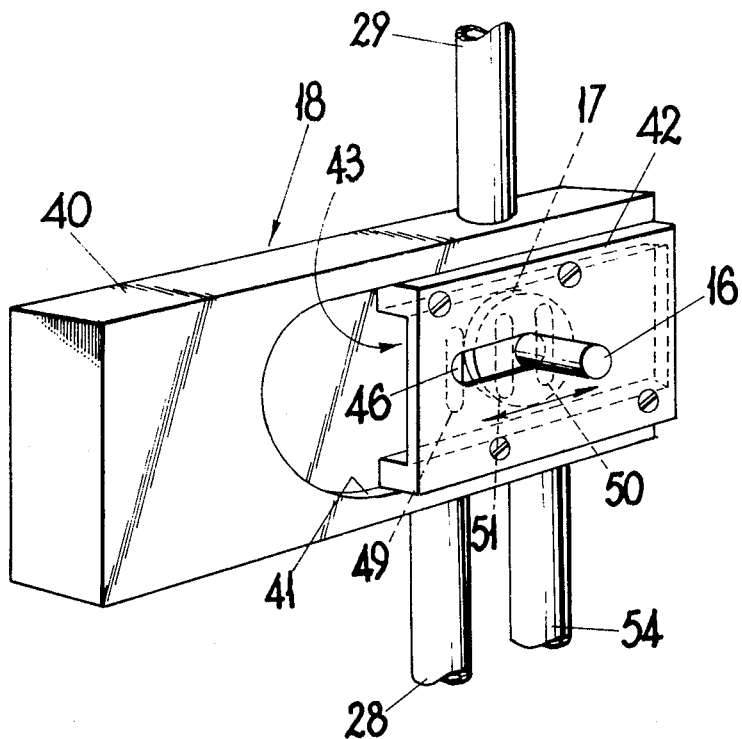
FIG. 4 is a perspective view on an enlarged scale of a valve construction employed in the milking machine of FIG. 3.

FIG. 3 shows a modified form of the milking machine shown in FIG. 2 incorporating a control device 30 similar to that of FIG. 1 but employing a valve 18 of different construction as shown in more detail in FIG. 4. Where possible in the following description, the same reference numerals as were used in FIGS. 1 and 2 have been used for corresponding parts in FIGS. 3 and 4.

Referring first to FIG. 4 the modified valve 18 comprises a valve body 40 formed with a channel-shaped recess 41 covered by a co-operating channel-shaped cover plate 42 to form an enclosed passage 43. A valve closure member 17 is slidable within the passage 43 between two positions determined by a slot 46 in the plate 42 through which a lug 16 carried by the valve member projects for engagement between the limbs of the elongate hook 14 of the control device.

The closure member 17 is in the form of a circular disc having a hollowed-out recess on its inner surface, and in each of its two positions is arranged to link, via said hollowed-out recess a respective one of two outer ports 49, 50 formed in the valve body 40 with a central port 51.

As shown in FIG. 3, the port 49 on the left hand side of the central port 51 is connected to the piston and cylinder arrangement 33 via tube 28, the right hand port 50 is connected to the vacuum milk collecting jar 27 via a tube 54, and the central port 51 is connected to a vacuum supply (not shown) via tube 29.

The operation of the modified milking machine is in general similar to that described with reference to FIG. 2 except that during the milking operation the teat cup cluster 32 is connected to the vacuum supply via the flow line 31, through vessels 1 and 5 of the control device 30, the milk collecting jar 27 and the valve 18, the valve member being held in the position in which it links ports 50 and 51.

When the milk flow from the cow ceases or drops below a predetermined rate causing the control lever 11 to drop, the valve member slides towards the left as shown in the drawings to the position in which it links the centre port 51 with the port 49 thereby cutting off the vacuum supply to, and admitting air into, the vacuum collecting jar 27 and thus the teat-cup cluster 32. In this position the valve 18 also connects the vacuum supply to the piston and cylinder arrangement 33, which then withdraws the teat-cup cluster 32 from the cow's udder.

Because no vacuum now exists in the collecting jar 27 the milk can more rapidly be emptied from it in preparation for the next milking operation. In addition the modified arrangement obviates the need for a vacuum-shut-off valve on the teat-cup cluster 32 enabling conventional teat-cup clusters to be used.

To enable the milk collecting jar 27 to be emptied automatically at the end of a milking operation, an outlet aperture 56 in the base of the jar is connected via a flexible rubber tube 58 fitted with a valve 59, to a common vacuum milk pipeline 57 arranged to withdraw milk under vacuum from each of a number of collecting jars 27 and carry it to a common collecting tank (not shown).

The valve 59 is controlled by a vacuum operated ram 61 connected by a tube 62 and T-connector 63 to the tube 54 and arranged to pinch the flexible tube 58 closed when vacuum is applied to the ram 61.

Thus, during a milking operation the valve 59 is closed because vacuum is applied simultaneously to the interior of jar 27 and to the ram 61 via tubes 54 and 62 respectively. When at the end of a milking operation the flow of milk in line 31 ceases or falls below a predetermined low value, and the control device 30 operates the valve 18 to admit air into the collecting jar 27 and connect the vacuum supply to the piston and cylinder arrangement 33, air is also admitted into the vacuum operared ram 61 thus allowing the valve 59 to open and thereby connect the outlet aperture 56 to the vacuum milk pipeline 57. Milk collected in the collecting jar 27 during the milking operation is thus automatically withdrawn from the milking jar 27 at the end of each milking operation.

To prevent air from being sucked into the vacuum pipeline 57 when the collecting jar 27 becomes empty, a spherical rubber sealing member 65 is provided within the jar 27. The sealing member 65 has a diameter greater than that of the outlet aperture 56, so that as the jar 27 becomes empty the sealing member 65 automatically covers and effectively seals the outlet aperture 56, but is otherwise arranged to float on the surface of any milk contained within the collecting jar.

When the lever 11 is reloaded for the next milking operation, the valve member 17 is moved to its right hand position to simultaneously apply a vacuum to the milk collecting jar 27 and the vacuum operated ram 61 to close the valve 59, and to admit air into the cylinder of the piston and cylinder arrangement 33 to permit the teat-cup cluster to be attached to the cow's udder.

In a further modification of the milking machine of FIG. 3 the control device 30 is replaced by a modified form of control device 30 is replaced by a modified form of control device 69 in accordance with the present invention.

Figure 5:
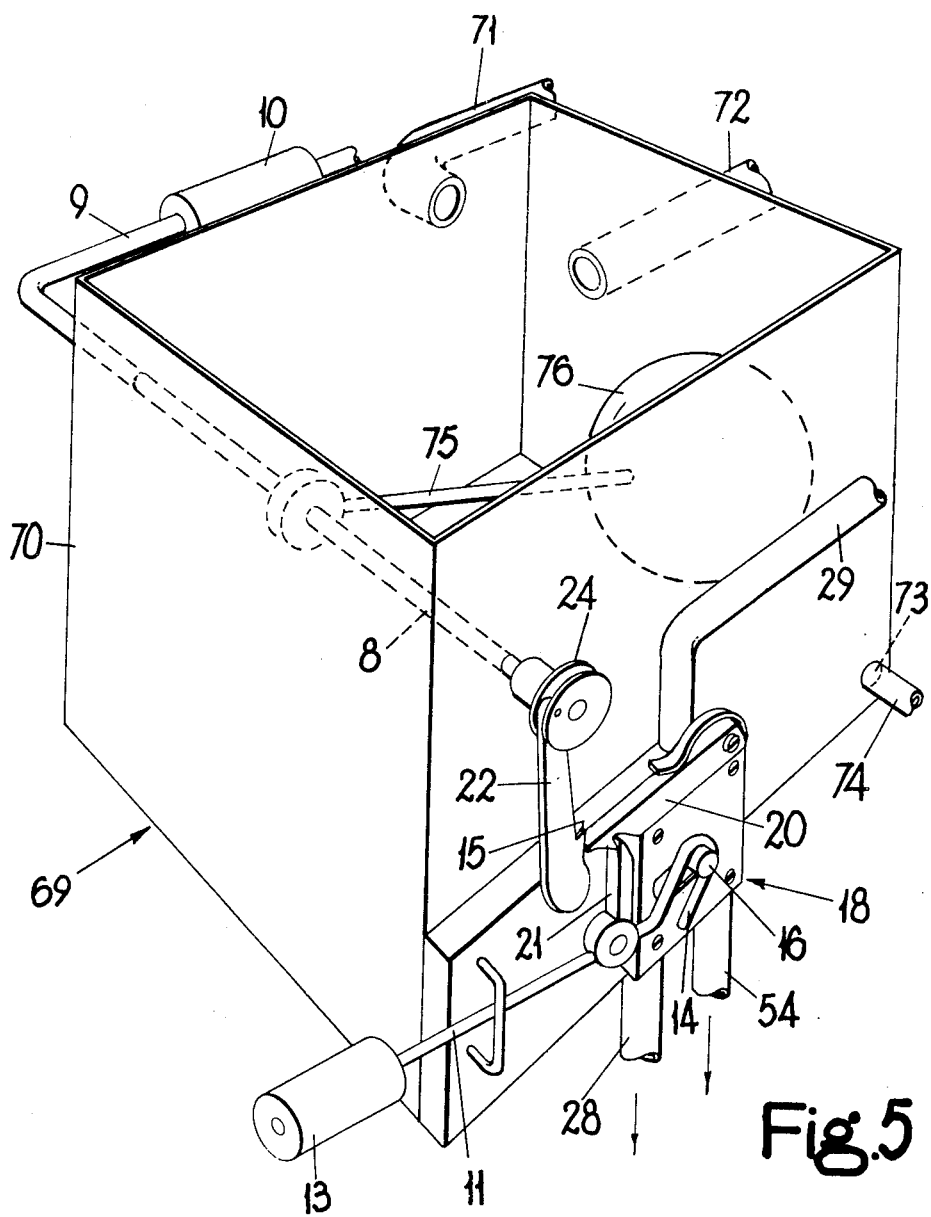
FIG. 5 is a perspective view of a float operated control device in accordance with the invention.

Referring to FIG. 5, the modified control device comprises vacuum tight chamber 70 having an inlet tube 71 and outlet tube 72 at the top for connection to the upstream and downstream sections respectively of the flow line 31, and a bleed orifice 73 at the bottom also arranged to be connected via a tube 74 to the downstream section of the flow line 31. Alternatively, the separate outlet tube 72 and bleed orifice 73 may be replaced by a single rigid tube, connected outside the chamber 70 to the downstream section of the flow line 31, projecting to the top of the interior of the chamber through the bottom thereof, and having a bleed orifice formed in the tube towards the bottom of the chamber.

The control device 69 carries a mechanism and valve 18 substantially identical to that described with reference to FIGS. 3 and 4 respectively, and accordingly the same reference numerals will be used for corresponding parts.

The shaft 8 is journalled in the walls of the chamber 70 so as to be rotatable and is integrally formed at one end with the weighted lever 9, and carries at its other end the disc 24 from which the trigger release member 22 is eccentrically pivotally suspended.

Within the chamber is a float 76 carried on the end of a lever 77 rigidly coupled to the centre of the shaft 8 so that at the start of a milking operation when the rate of flow of milk in the flow line 31 exceeds the predetermined low value, the chamber fills up, lifting the float 76 and thus also the lever 9. As described before, this causes the shoulder 15 of the trigger release member 22 to engage the trigger element 20 so that when the flow of milk ceases or falls below the predetermined low value at the end of the milking operation, the chamber 70 empties thus causing the float to fall under its own weight and assisted by the action of the weight 10. This in turn causes the trigger release member 22 to raise the trigger element 20 and release the loaded control lever to actuate the valve 18.

I claim:
1. A control device designed to be responsive to a change in the rate of flow of liquid in a flow line between a relatively high value and a relatively low value, said device including
    A. a vessel through which the liquid is arranged to pass and in which it can attain different levels,
    B. a control member
        a. movable in response to the change in volume of liquid in the vessel
            i. between a first position into which it is biased when the vessel is empty, and
            ii. a second position into which it is arranged to move when the vessel is full,
    C. the vessel having in its lower part an aperture through which liquid can flow out of the vessel, and
    D. the arrangement, including the size of the aperture, being such that
        a. when the liquid flow rate changes from the relatively low to the relatively high value the vessel fills and the control member moves to its second position, and
        b. when the liquid flow rate changes from the relatively high to the relatively low value the vessel empties through the aperture and the control member moves to its first position under the action of the biasing force, and
    E. a mechanism responsive to movement of the control member between its two positions to actuate control means, said mechanism including
        a. an actuating member
        b. means coupling said actuating member to said control means,
        C. a trigger element adapted to hold said actuating member in a loaded position against the action of a biasing force,
        d. a trigger release member, the control member being coupled to said trigger release member,
        e. said trigger release member being operative upon movement of the control member from its second to its first position to release the actuating member and so cause it to actuate said control means.

2. A control device according to claim 1 wherein the control member consists of the vessel itself which is arranged to be biased into an upper (i.e. first) position at the lower liquid flow rate and to move under gravity to a lower (i.e. second) position at the higher liquid flow rate, and which vessel is contained within an outer container within which it is arranged to move and into which the liquid flowing through said aperture, and otherwise from the vessel at the relatively high flow rate, is arranged to pass and which has an outlet capable of passing the whole of the liquid at the relatively high flow rate.

3. A control device according to claim 1 wherein the control member consists of a float which rests on the surface of the liquid in the vessel and rises to its second position or falls to its first position with the liquid level.

4. A control device according to claim 1, wherein said actuating member comprises a pivotted control lever having a weighted end which is arranged to drop from an upper position at which the lever is loaded to a lower position upon release of said trigger element.

5. A control device according to claim 4, wherein the control member is biased into its first position by a second pivotted lever having a weighted end which provides the member biassing force, the arrangement being such that an upper position of the said second lever corresponds to the second position of the control member and a lower position of said second lever corresponds to the first position of the control member, and such that movement of said second lever from its upper to its lower position causes said trigger release member to operate the trigger element and release the control lever.

6. A control device according to claim 5, wherein the trigger release member is pivotted on an extension of said second lever beyond its pivot and away from its weighted end, and is formed with a shoulder such that on movement of the second lever from its lower to its upper position the shoulder engages with the trigger element so that upon subsequent movement of the second lever from its upper to its lower position the trigger element is operated by the upward pull of the shoulder.

7. A control device according to claim 6, wherein the control lever carries a pawl by means of which it is held in its loaded upper position by the engagement of the pawl in a detent carried by the trigger element, the latter being of resilient cantilever form so as to return to its initial position after being raised by the trigger release member shoulder to allow the control lever to fall.

8. A control device according to claim 1 wherein the mechanism is arranged to open or close a valve between the inlet and outlet of a gas flow passage carried by the device.

9. A milking machine comprising a teat-cup cluster arranged to be applied to the tests of an animal's udder during the milking operation, and vacuum means connectable to the teat-cup cluster through a flow line for drawing milk from the udder in use of the machine, the machine incorporating a control device according to claim 1 arranged to control actuating means for withdrawing the teat-cup cluster from the animal's udder when the rate of flow of milk in the flow line falls below a predetermined low value corresponding to completion of the milking operation.

10. A milking machine according to claim 9, wherein said control means of the control device is operative, when actuated, to cut off the vacuum to the teat-cup cluster and to apply a vacuum to a piston and cylinder arrangement the pistion of which is connected to the teat-cup cluster and arranged to withdraw the teat-cup cluster from the animal's udder when the vacuum is applied to the cylinder.

11. A milking machine according to claim 10 wherein the teat-cup cluster carries a vacuum shut-off valve having a closure member normally biased into its open position, and the piston of the piston and cylinder arrangement is coupled to the teat-cup cluster via said closure member by a flexible cable, the arrangement being such that upon application of a vacuum to the piston and cylinder arrangement, the piston pulls on the cable to draw the closure member into its closed position and thereby cut off the vacuum to the teat-cup cluster, and subsequently withdraws the teat-cup cluster from the animals's udder.

12. A milking machine according to claim 10, wherein said control means includes a valve carried by the control device and connected in a gas flow passage between said vacuum means and the piston and cylinder arrangement, the control device being operable too actuate the valve to apply a vacuum to the cylinder when the rate of flow of milk in the flow line falls below said predetermined low value.

13. A milking machine according to claim 12, wherein said valve is also arranged, upon actuation, to disconnect the vacuum means from the teat-cup cluster so as to release it from the animal's udder.

14. A milking machine according to claim 13, wherein said valve is connected in a gas flow passage between the vacuum means and a milk collecting jar connected to the downstream end of said flow line, so that the vacuum means is connectable to the teat-cup cluster through the milk collecting jar, the milk collecting jar having in its base an outlet aperture connectable to a vacuum milk pipeline for withdrawing milk from the collecting jar following actuation of the valve to disconnect the vacuum means from the teat-cup cluster.

15. A milking machine according to claim 14, wherein the milk collecting jar includes a sealing member arranged to float on the surface of milk contained within the collecting jar, in use of the machine, and to automatically seat over, and seal the said outlet aperture when the collecting jar becomes empty.

16. A milking machine according to claim 15, including a milk flow control valve connected in a milk flow passage between the outlet aperture of the collecting jar and the vacuum milk pipeline and controllable by a vacuum operated actuating means connected to the gas flow passage between the valve of the control means and the teat-cup cluster, the arrangement being such that when the vacuum means is connected to the teat-cup cluster, vacuum is also applied to the vacuum operated actuating means whereby to close said milk flow control valve, and when the vacuum means is disconnected from the teat-cup cluster, upon actuation of the valve of the control means, the milk flow control valve is arranged to be opened by the release of the vacuum operated actuating means.

* * * * *